Patented July 10, 1945

2,380,156

UNITED STATES PATENT OFFICE 2,380,156

WELL DRILLING

William M. Dobson and Albert L. Frye, Long Beach, and Truman A. Griggs, San Pedro, Calif., assignors to Richfield Oil Corporation, Los Angeles, Calif., a corporation of New Jersey No Drawing. Application June 10, 1941, Serial No. 397,384

2 Claims. (Cl. 252—8.5)

This invention relates to improvements in well drilling operations involving the use of drilling fluids or muds. The invention is particularly valuable in that through its application water losses are decreased and much better plastering of the walls of the well hole is obtained.

Drilling fluids now used in rotary drilling operations generally consist of colloidal suspensions of clay. This fluid performs several functions. It lubricates the drill bit, carries the rock cuttings to the surface and forms a relatively impervious sheath on the walls of the bore hole. It is generally used under such pressure head as to provide sufficient hydrostatic pressure to prevent escape of gas from high pressure formations encountered during the drilling operation.

In attempts to improve drilling fluids in the performance of these functions it has been customary to treat clay suspensions with various chemical agents, such as alkali hydroxides, carbonates, phosphates, silicates, tannates, humates or combinations thereof.

While a satisfactory drilling fluid must be essentially colloidal to prevent the settling of the cuttings in the bore hole, it must also possess the ability to form a substantially impervious sheath on the walls of the bore hole. The loss of drilling fluid to the surrounding formation is directly proportional to the compactness of this sheath. The addition of various chemicals to the drilling fluid results in improved performance in some of its functions, the effect of such additions being to increase the dispersion of the suspended particles in the drilling fluid. To obtain an impervious and compact mud sheath on the walls of the bore hole, it is necessary that the fluid contain a relatively large amount of particles of colloidal fineness. Most clays used in drilling fluids do not contain a sufficient amount of particles of colloidal fineness or contain alkali ions which flocculate the colloidal size particles into aggregates which are incapable of forming an impervious and compact mud sheath.

In accordance with the present invention, we employ a drilling fluid composed of emulsified asphalt and clay suspension which produces a material with a greater percentage of particles of colloidal size. We have discovered that a drilling fluid of this type has a greater percentage of particles of colloidal fineness and therefore is superior to the drilling fluids now in use because it has a greater ability to retard water losses into the surrounding formations. The cake or sheath produced on the wall of the bore hole is more impervious and compact than those now employed.

In carrying out the invention we employ asphalt emulsions of the type which are readily miscible with water, Portland cement and other materials inert to emulsified asphalts. The emulsified asphalt must also be of a character which will not be destroyed by the presence of electrolytes. In forming the drilling fluid the proportions of emulsified asphalt and clay or other material may vary widely depending upon the specific properties desired. The emulsified asphalt probably serves as a finely divided material tending to fill the interstices of the clay particles, thus producing a tighter seal in the sheath deposited on the sides of the well. Due to the fact that it is not a rigid solid under conditions generally met at the bottom of a well hole, it tends to fill the voids between the clay particles. In the emulsified form there is little tendency for the asphalt particles to unite with each other or with the clay particles.

In accordance with the invention the emulsified asphalt may be added to the drilling fluid at a point near the intake of the circulating pumps which insures a thorough mixing of the emulsion with the mud during circulation. The mud itself may be formed from clays present in the bore or may be compounded outside the bore hole from any desired clays, such as bentonite. The usual weighing materials which are frequently mixed in the drilling fluid, such as hematites, barytes, etc., may be incorporated into the mud if desired. The amount of the emulsified asphalt to be used is regulated according to the properties of the mud and also, to some extent, according to the character of the strata through which the drilling operation is conducted. In practicing the invention we may use concentrations of asphalt varying from 5 to 95 percent by weight. We have found that approximately a 50–50 mixture of mud and emulsified asphalt is satisfactory.

The emulsion which we employ may be prepared by comingling a fluid hydrocarbon and a water solution of soap containing a protein, such as casein, blood, resin or other emulsifying agent. The comingling is best produced by violent agitation. The hydrocarbon employed may vary from light petroleum oils to high melting point asphalts or we may employ coal tar derivatives, such as pitch. We prefer to use an asphalt of 225 penetration.

The results obtained in treating ordinary drilling muds according to the present invention are shown in the following examples:

Example I

A suspension of Rogers Dry Lake mud was prepared by jetting, heating and ageing until it had a density of 76.8 lbs. per cu. ft. To this was added emulsified asphalt in concentrations of 10 percent, 20 percent and 40 percent, and the resulting mixtures thoroughly mixed.

This emulsified asphalt is made as follows: 23.2 grams of oleic acid is allowed to react with 26.6 grams of sodium hydroxide in 4.684 liters of water. A second mixture is prepared which contains 187 grams of casein, 5.7 grams of sodium hydroxide, and 5 ml. of aqueous ammonia in 1.785 liters of water. These solutions are mixed and heated to approximately 120° F. The warmed water solution is fed to a circulating pump where it is mixed with 7.700 liters of asphalt which has been heated to about 250° F. The violent agitation obtained in the circulating pump produces the desired oil-in-water emulsion.

The thickness of the mud sheath and the c. c.'s of liquid expressed from this drilling fluid when placed in a standard filter press with a screen area of 7 sq. in. under 100 p. s. i. and room temperature are given below:

|  | Rogers Dry Lake clay | Percent 225 pen. emulsified asphalt added | | |
|---|---|---|---|---|
|  |  | +10% | +20% | +40% |
| Cake thickness in 1/32" | 5 | 5 | 4 | 2 |
| Initial water loss in c. c. 60 min. from drip point | 21.4 | 11.4 | 7.2 | 2.2 |

Example II

Under the same conditions, 25% of an 80-penetration emulsified asphalt and 25% of 170° M. P. were added to this same batch of hydrated Rogers Dry Lake clay. Results were:

|  | Rogers Dry Lake clay | Emulsified asphalt added | |
|---|---|---|---|
|  |  | +25% 80 pen. | +25% 170° M. P. |
| Cake thickness in 1/32" | 5 | 3 | 3 |
| Initial water loss in c. c. 60 min. from drip point | 21.4 | 10.0 | 10.0 |

Example III

A drilling fluid composed of Rogers Dry Lake clay and hole mud, which had been treated with sodium pyrophosphate and quebracho to obtain a maximum decrease in the water loss, was tested against a 50—50 mixture of Rogers Dry Lake clay and 225 pen. emulsified asphalt in a filter press with a filter area of 5 sq. in. at an average temperature of 180° F. and an average pressure of 2000 p. s. i. for one hour. Results were:

|  | Drilling fluid composed of Rogers Dry Lake clay, hole mud, sodium pyrophosphate and quebracho | 50-50 mixture of Rogers Dry Lake clay 225 pen. emulsified asphalt |
|---|---|---|
| Cake thickness in 1/32" | 8 | 4 |
| Initial water loss in c. c. 60 min. from drip point | 42.5 | 9.0 |

From these examples it will be seen that under ordinary conditions, the improvement in the imperviousness and compactness of the cake is proportional to the amount of emulsified asphalt present in the drilling fluid.

An advantage of the use of drilling fluids of the character above described resides in the beneficial action of the emulsified asphalt on drilling fluids which have already been treated with other dispersing agents. Drilling fluids which are repeatedly subjected to treatment with chemicals, such as sodium pyrophosphate, sodium hydroxide, sodium carbonate, etc. finally reach a concentration where the flocculating effect of their alkali ions results in harmful effect on the mud sheath by any further additions rather than a beneficial effect. However, the imperviousness and compactness of the mud sheath of such overtreated drilling fluids may still be improved through the addition of emulsified asphalts. The emulsified asphalt may be added to drilling fluids which contain chemical agents, such as alkali pyrophosphates, hydroxides, carbonates, silicates, tannates, humates and the like. For example the imperviousness and compactness of the mud sheath of a drilling fluid made from Rogers Dry Lake clay may be increased to its maximum by treating it with pyrophosphate and then adding approximately 40 percent of an emulsified asphalt of the type described above.

After the drilling fluid comprising the suspension of clay and emulsified asphalt has been circulated through the well for a period of time and its ability to form an impervious sheath has been lowered, it may be restored by adding additional emulsified asphalt thereto. In such instances the emulsified asphalt is mixed with the aqueous drilling fluid in the proportions of 5 to 95 percent of the emulsion in the manner heretofore described to form an oil-in-water emulsion and the material then circulated as heretofore described to form an impervious sheath on the walls of the well.

Throughout the specification the word "impervious" is used to define the ability of a mud sheath to retard the loss of the suspending water when the mud sheath is subjected to a differential in pressure due to the difference between the hydrostatic head of the drilling fluid and the formation pressure of the formation penetrated.

We claim:

1. The process of circulating an aqueous drilling fluid in a well and forming a substantially impervious sheath on the walls of the bore hole which comprises preparing an aqueous suspension of clay, adding from 5 to 95 percent of an emulsion of asphalt thereto to form an oil-in-water emulsion, circulating the suspension whereby its ability to form an impervious sheath is decreased and adding additional emulsion of asphalt thereto.

2. The process which comprises circulating an aqueous drilling fluid comprising an aqueous suspension of clay containing a dispersing agent in a well, adding additional dispersing agent thereto as required until the flocculating effect of the dispersing agent produces a harmful effect on the ability of the drilling fluid to produce a substantially impervious sheath on the walls of the bore hole, adding from 5 to 95 percent of an aqueous emulsion of asphalt to the aqueous drilling fluid to form an oil-in-water emulsion and recirculating the emulsion in the wall.

WILLIAM M. DOBSON.
ALBERT L. FRYE.
TRUMAN A. GRIGGS.